(12) United States Patent
Fadaifard (10) Patent No.: US 12,417,643 B2
(45) Date of Patent: Sep. 16, 2025

(54) SYSTEMS AND METHODS FOR UPDATING A CURRENT BASE MODEL COMPRISING A PLURALITY OF IMAGES

(71) Applicant: Woven by Toyota, Inc., Tokyo (JP)

(72) Inventor: Hadi Fadaifard, Tokyo (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 79 days.

(21) Appl. No.: 18/498,525

(22) Filed: Oct. 31, 2023

(65) Prior Publication Data
US 2025/0139983 A1    May 1, 2025

(51) Int. Cl.
| | | |
|---|---|---|
| *G06V 20/58* | (2022.01) | |
| *G06T 7/70* | (2017.01) | |
| *G06V 10/24* | (2022.01) | |
| *G06V 10/44* | (2022.01) | |
| *G06V 10/74* | (2022.01) | |
| *G06V 10/75* | (2022.01) | |
| *G06V 20/56* | (2022.01) | |

(52) U.S. Cl.
CPC .............. *G06V 20/58* (2022.01); *G06T 7/70* (2017.01); *G06V 10/245* (2022.01); *G06V 10/44* (2022.01); *G06V 10/761* (2022.01); *G06V 20/588* (2022.01)

(58) Field of Classification Search
CPC ...... G06V 20/58; G06V 10/761; G06V 10/44; G06V 20/588; G06V 10/245; G06T 7/70
USPC ......................................................... 348/148
See application file for complete search history.

(56) References Cited

U.S. PATENT DOCUMENTS

| | | | |
|---|---|---|---|
| 8,798,965 B2 | 8/2014 | Quan et al. | |
| 9,189,689 B2 | 11/2015 | Chandraker et al. | |
| 10,026,218 B1 | 7/2018 | Mertens et al. | |
| 10,706,576 B2 | 7/2020 | Ondruska et al. | |
| 10,909,758 B2 | 2/2021 | Bell et al. | |
| 11,054,271 B2 | 7/2021 | Viswanathan | |
| 2015/0022665 A1* | 1/2015 | Lu | B60R 1/26 348/148 |
| 2018/0192035 A1* | 7/2018 | Dabeer | G06T 5/50 |
| 2018/0246907 A1* | 8/2018 | Thiel | G06F 16/29 |
| 2020/0175718 A1* | 6/2020 | Viswanathan | G06V 20/584 |

(Continued)

FOREIGN PATENT DOCUMENTS

| | | | | |
|---|---|---|---|---|
| CA | 2973959 A1 * | 1/2019 | ............. | E01C 23/01 |
| EP | 3530521 A1 * | 8/2019 | ............... | B60R 1/00 |

*Primary Examiner* — Kathleen M Walsh
(74) *Attorney, Agent, or Firm* — DINSMORE & SHOHL LLP (57) ABSTRACT

Systems and methods for updating a current base model are provided. The systems include a controller programmed to obtain a current base model comprising a plurality of images, a 3D pointset, and geometric features, retrieve captured video data comprising a plurality of video frames with location data of a vehicle as the vehicle drives a route, localize the route of the vehicle and determine a pose of the vehicle using the video data from the vehicle and the current base model, identify one or more features, one or more objects, or both, present in the video data and not in the current base model, and perform a triangulation process, using the determined localization including location data of the vehicle and pose data of the vehicle, to position the identified features, the identified objects, or both, within the current base model to update the current base model.

20 Claims, 8 Drawing Sheets

(56) References Cited

U.S. PATENT DOCUMENTS

2022/0319043 A1   10/2022  Chandler et al.
2024/0282002 A1*  8/2024  Wang ..................... G06V 10/40

* cited by examiner

SYSTEMS AND METHODS FOR UPDATING A CURRENT BASE MODEL COMPRISING A PLURALITY OF IMAGES

TECHNICAL FIELD

The present disclosure relates to systems and methods for updating a current base model comprising a plurality of images, a 3D pointset, and geometric features representing a driving environment. The base model is used to construct high definition (HD) maps used by autonomous and non-autonomous vehicles.

BACKGROUND

Driving environments are continuously changing as improvements and changes to infrastructure are made. Additionally, new construction and updates to existing landscapes change the environments around roads. Features from the environments around the roads are used in conjunction with navigational systems to localize vehicles. Accordingly, maps that define these environments require updates from time to time. Conventional systems and methods update existing maps by rescanning the environment and rebuilding the maps. These systems and methods are time-consuming and expensive. Moreover, these systems and methods can be inaccurate as many rely on manual processing of data and algorithms that do not account for the pose a sensor that captured the data being utilized for updating the base model.

SUMMARY

The present disclosure provides systems and methods for updating a current base model comprising a plurality of images. The systems and methods improve the accuracy and efficiency of processes for updating the current base model without needing to update entire features in the current base model. As a results, high-definition maps are produced, which can be used by autonomous or non-autonomous driving systems. The processes for updating the base model can be achieved at reduced cost and efforts.

In embodiments, a system of updating a current base model comprising a plurality of images includes a controller. The controller is programmed to obtain a current base model comprising a plurality of images, retrieve captured video data comprising a plurality of video frames with location data of a vehicle as the vehicle drives a route, localize the route of the vehicle and determine a pose of the vehicle using the video data from the vehicle and the current base model, identify one or more features, one or more objects, or both, present in the video data and not in the current base model, and perform a triangulation process, using the determined localization including location data of the vehicle and pose data of the vehicle, to position the identified features, the identified objects, or both, within the current base model to update the current base model.

In some embodiments, a method of updating a current base model comprising a plurality of images includes obtaining a current base model comprising a plurality of images, retrieving captured video data comprising a plurality of video frames with location data of a vehicle as the vehicle drives a route, localizing the route of the vehicle and determine a pose of the vehicle using the video data from the vehicle and the current base model, identifying one or more features, one or more objects, or both, present in the video data and not in the current base model, and performing a triangulation process, using the determined localization including location data of the vehicle and pose data of the vehicle, to position the identified features, the identified objects, or both, within the current base model to update the current base model.

These and additional features provided by the embodiments of the present disclosure will be more fully understood in view of the following detailed description, in conjunction with the drawings.

BRIEF DESCRIPTION OF THE DRAWINGS

The following detailed description of specific embodiments of the present disclosure can be best understood when read in conjunction with the following drawings, where like structure is indicated with like reference numerals.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

The embodiments disclosed herein include systems and methods for updating a current base model comprising a plurality of images, 3D point data, and geometric features. The The term "3D pointset" or "3D point data" refers every points of objects including landmarks and geographical landforms, in three-dimensional space by means of three coordinates. The term "geometric features" refer features of objects constructed by a set of geometric elements such as, points, lines, curves, or surfaces. The systems and methods may construct and maintain a base model which contains the 3D pointset and geo-localized images of the environment, both of which are obtained when the area is scanned by a survey vehicle. A high definition (HD) map, which contains the geometric features of the environment, e.g., drivable lanes, traffic signs and lights, is constructed from the images and the 3D point data. The HD map, together with the geo-localized images, and the 3D pointset define the base model. The initial pointset that is acquired by the survey vehicle sensors, e.g., via LiDAR scanners, may be misaligned with the geo-localized images of the environment. In such cases, the images are fused with the 3D pointset, e.g., LIDAR 3D pointset, by triangulating 2D features visible in the multiple images, obtaining a secondary 3D pointset, and aligning this secondary 3D pointset with the initial 3D pointset. The systems and methods accurately update a current base model by retrieving captured video data with location data of a vehicle, and localizing a route and a pose of the vehicle and improve the accuracy and efficiency of processes for updating the current base model. The systems and methods may not require updating entire features in the current base model. As a result, high-definition maps are produced, which can be used by autonomous or non-autonomous driving systems.

Figure 1:
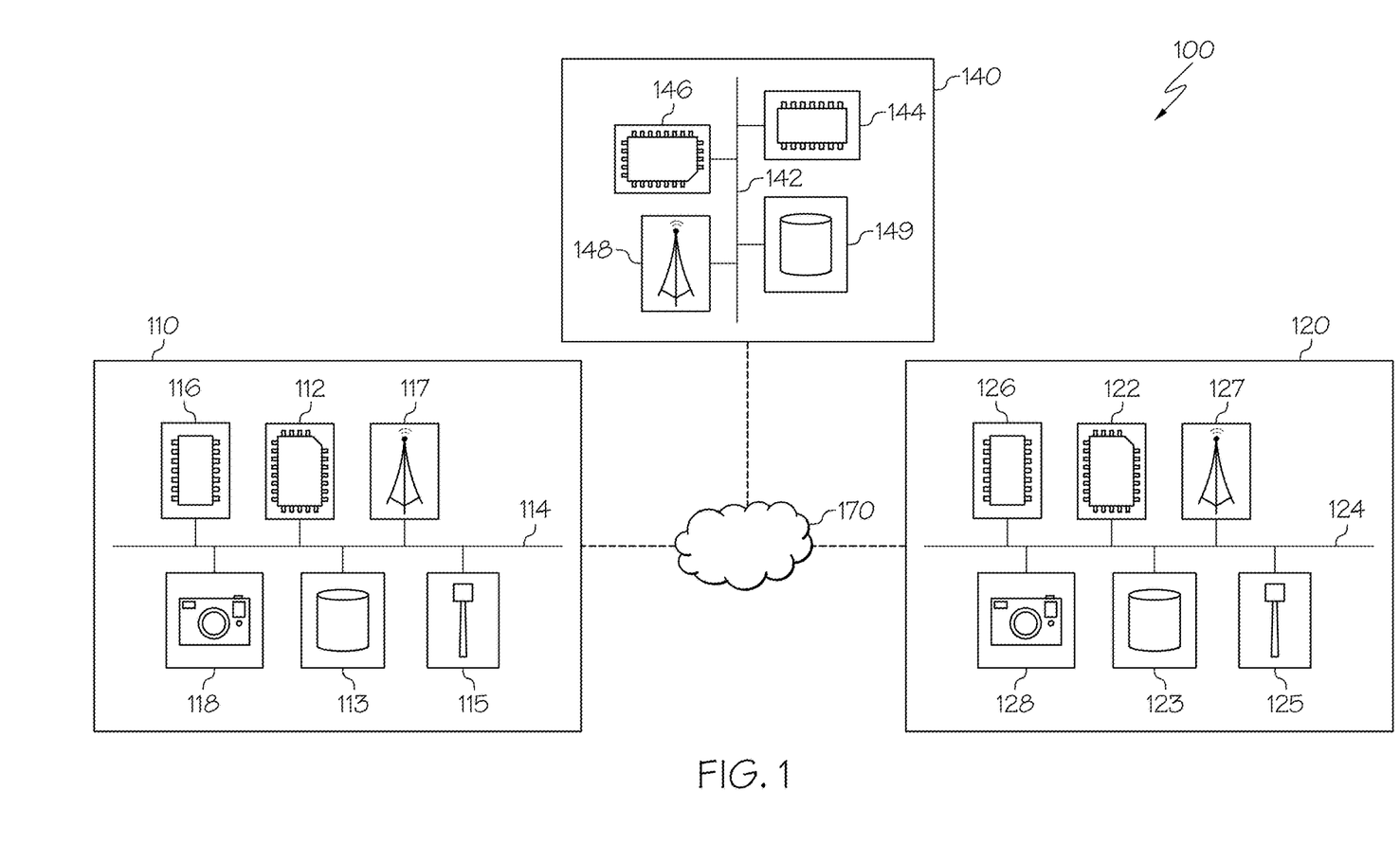
FIG. 1 depicts a schematic diagram of a system for updating a current base model, according to one or more embodiments shown and described herein.

The first vehicle system 110 includes one or more processors 112. Each of the one or more processors 112 may be any device capable of executing machine-readable and executable instructions. Each of the one or more processors 112 may be a controller, an integrated circuit, a microchip, a computer, or any other computing device. The one or more processors 112 are coupled to a communication path 114 that provides signal interconnectivity between various components of the system. The communication path 114 may communicatively couple any number of processors 112 with one another, and allow the components coupled to the communication path 114 to operate in a distributed computing environment. Each of the components may operate as a node that may send and/or receive data. As used herein, the term "communicatively coupled" means that coupled components are capable of exchanging data signals with one another such as electrical signals via a conductive medium, electromagnetic signals via air, optical signals via optical waveguides, and the like.

The communication path 114 may be formed from any medium that is capable of transmitting a signal such as conductive wires, conductive traces, optical waveguides, or the like. In some embodiments, the communication path 114 may facilitate the transmission of wireless signals, such as WiFi, Bluetooth®, Near Field Communication (NFC), and the like. The communication path 114 may be formed from a combination of mediums capable of transmitting signals. In one embodiment, the communication path 114 comprises a combination of conductive traces, conductive wires, connectors, and buses that cooperate to permit the transmission of electrical data signals to components such as processors, memories, sensors, input devices, output devices, and communication devices. The communication path 114 may comprise a vehicle bus, such as a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The first vehicle system 110 includes one or more memory components 116 coupled to the communication path 114. The first vehicle system 110 may contain non-transitory computer-readable medium comprising RAM, ROM, flash memories, hard drives, or any device capable of storing machine-readable and executable instructions. The machine-readable and executable instructions stored in the one or more memory components 116 can be accessed by the one or more processors 112. The machine-readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable and executable instructions and stored in the one or more memory components 116. The machine-readable and executable instructions may be written in a hardware description language (HDL), such as logic implemented via either a field-programmable gate array (FPGA) configuration or an application-specific integrated circuit (ASIC), or their equivalents. The methods described herein may be implemented in any conventional computer programming language, as pre-programmed hardware elements, or as a combination of hardware and software components. The one or more processors 112 along with the one or more memory components 116 may operate as a controller for the first vehicle system 110.

Still referring to FIG. 1, the first vehicle system 110 includes one or more image sensors 118. One or more image sensors 118 may be any device having an array of sensing devices capable of detecting radiation in an ultraviolet wavelength band, a visible light wavelength band, or an infrared wavelength band. One or more image sensors 118 may detect the presence of the first vehicle system 110, the presence of the second vehicle system 120, the location of the first vehicle system 110, the location of the second vehicle system 120, the distance between the first vehicle system 110 and the second vehicle system 120. One or more image sensors 118 may have any resolution. In some embodiments, one or more optical components, such as a mirror, fish-eye lens, or any other type of lens may be optically coupled to one or more image sensors 118. In some embodiments, one or more image sensors 118 may provide image data to one or more processors 112 or another component communicatively coupled to the communication path 114. In some embodiments, one or more image sensors 118 may provide navigation support. In embodiments, data captured by one or more image sensors 118 may be used to autonomously or semi-autonomously navigate the first vehicle system 110.

Figure 4:
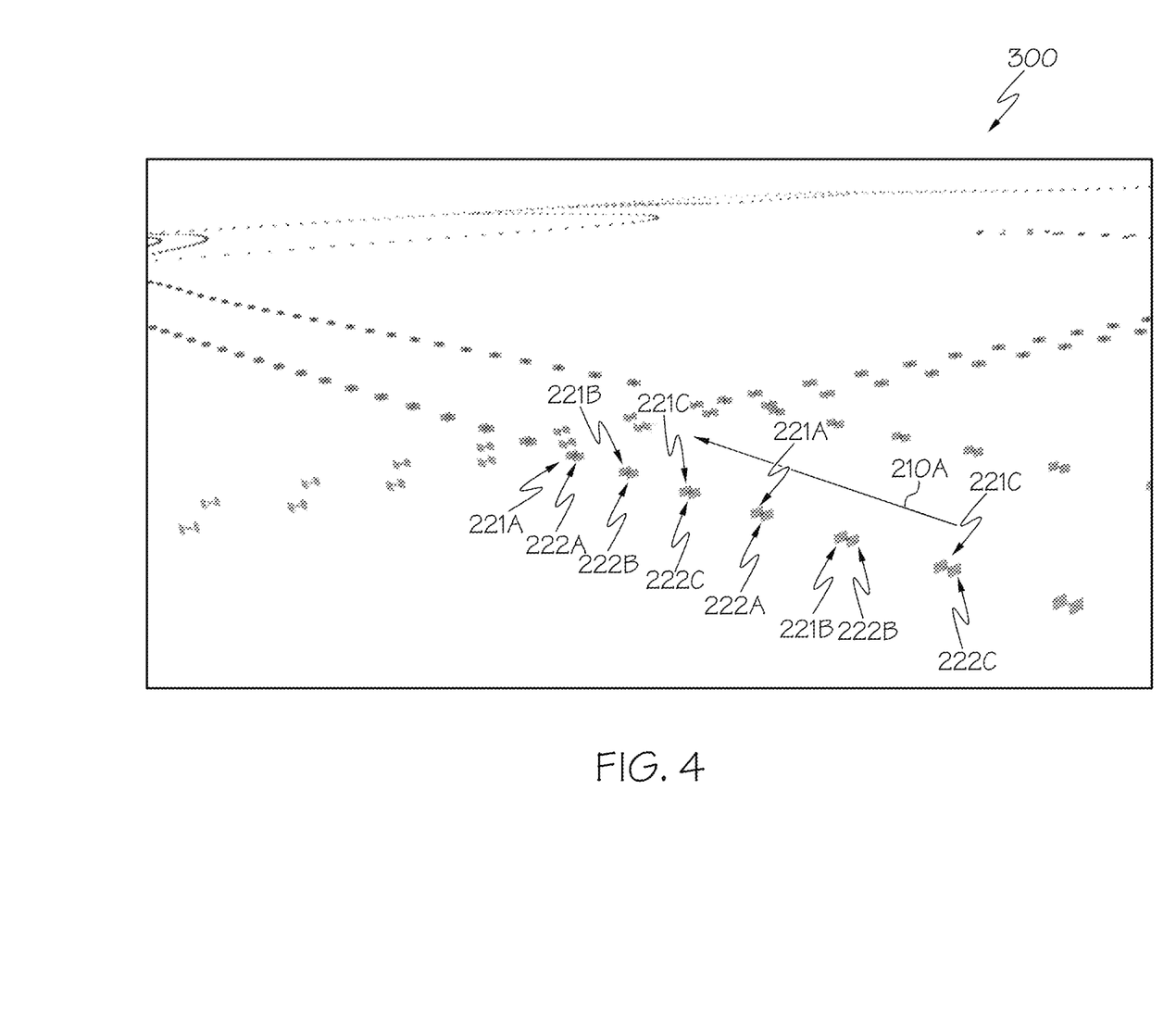
FIG. 4 depicts an exemplary current base model, according to one or more embodiments shown and described herein.

In some embodiments, one or more image sensors 118 may include one or more video sensors configured to capture a plurality of spherical images 210 (shown in FIG. 2A) to obtain a current base model 300 (shown in FIG. 4). In some embodiments, one or more image sensors 118 may include as cameras. The one or more image sensors 118 may obtain each spherical image by capturing multiple non-spherical images and fusing them together.

In some embodiments, one or more image sensors 118 include one or more image sensors configured to operate in the visual and/or infrared spectrum to sense visual and/or infrared light. In some embodiments, one or more image sensors 118 include one or more LIDAR sensors, radar sensors, sonar sensors, or other types of sensors for gathering data that could be integrated into or supplement the data collection. Ranging sensors like radar sensors may be used to obtain rough depth and speed information for the view of the first vehicle system 110.

The first vehicle system 110 includes a satellite antenna 115 coupled to the communication path 114 such that the communication path 114 communicatively couples the satellite antenna 115 to other components of the first vehicle system 110. The satellite antenna 115 is configured to receive signals from global positioning system satellites. In one embodiment, the satellite antenna 115 includes one or more conductive elements that interact with electromagnetic signals transmitted by global positioning system satellites. The received signal is transformed into a data signal indicative of the location (e.g., latitude and longitude) of the satellite antenna 115 or an object positioned near the satellite antenna 115, by one or more processors 112.

The first vehicle system 110 includes one or more vehicle sensors 113. Each of one or more vehicle sensors 113 is coupled to the communication path 114 and communicatively coupled to one or more processors 112. One or more vehicle sensors 113 may include one or more motion sensors for detecting and measuring motion and changes in the motion of the first vehicle system 110. The motion sensors may include inertial measurement units. Each of the one or more motion sensors may include one or more accelerometers and one or more gyroscopes. Each of one or more motion sensors transforms sensed physical movement of the vehicle into a signal indicative of an orientation, a rotation, a velocity, or an acceleration of the vehicle.

Still referring to FIG. 1, the first vehicle system 110 includes a network interface hardware 117 for communicatively coupling the first vehicle system 110 to the server 140. The network interface hardware 117 may be communicatively coupled to the communication path 114 and may be any device capable of transmitting and/or receiving data via a network 170. The network interface hardware 117 may include a communication transceiver for sending and/or receiving any wired or wireless communication. For example, the network interface hardware 117 may include an antenna, a modem, LAN port, Wi-Fi card, WiMAX card, mobile communications hardware, near-field communication hardware, satellite communication hardware and/or any wired or wireless hardware for communicating with other networks and/or devices. In one embodiment, the network interface hardware 117 includes hardware configured to operate in accordance with the Bluetooth® wireless communication protocol. The network interface hardware 117 of the first vehicle system 110 may transmit data collected and/or generated by the one or more image sensors 118 or the one or more vehicle sensors 113 to the server 140. For example, the network interface hardware 117 of the first vehicle system 110 may transmit vehicle data, location data, maneuver data, and the like to the server 140.

The first vehicle system 110 may connect with one or more other systems (e.g., the second vehicle system 120) and/or external processing devices (e.g., a cloud server, an edge server, or both) via a direct connection. The direct connection may be a vehicle-to-vehicle connection ("V2V connection"), or a vehicle-to-everything connection ("V2X connection"). The V2V or V2X connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect, which may be in lieu of, or in addition to, a direct connection (such as V2V, V2X) between the vehicles or between a vehicle and an infrastructure.

Still referring to FIG. 1, the first vehicle system 110 may be communicatively coupled to the second vehicle system 120, the server 140, or both, by the network 170. In one embodiment, the network 170 may include one or more computer networks (e.g., a personal area network, a local area network, or a wide area network), cellular networks, satellite networks and/or a global positioning system and combinations thereof. The first vehicle system 110 may be communicatively coupled to the network 170 via a wide area network, a local area network, a personal area network, a cellular network, a satellite network, etc. Suitable local area networks may include wired Ethernet and/or wireless technologies such as Wi-Fi. Suitable personal area networks may include wireless technologies such as IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Figure 6:
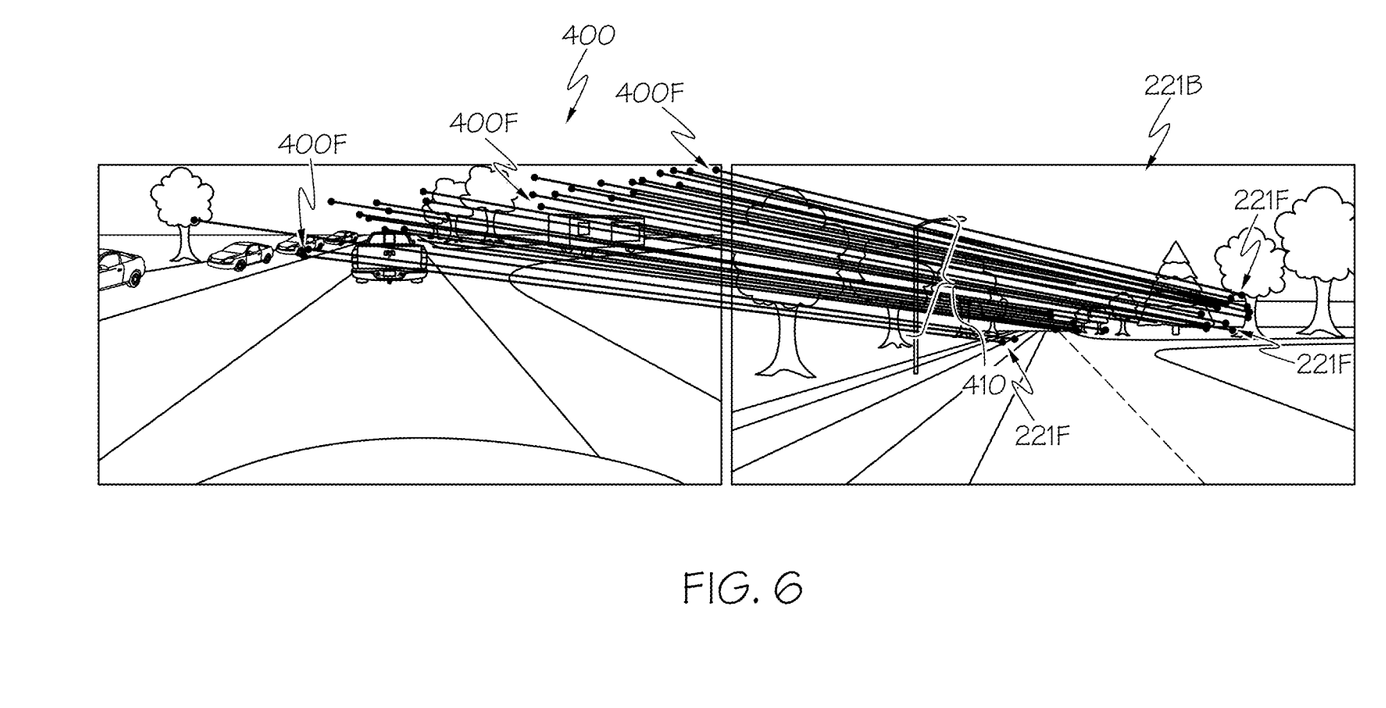
FIG. 6 depicts an exemplary features correspondence between a closest image and each of the plurality of video frames, according to one or more embodiments shown and described herein.

Still referring to FIG. 1, the second vehicle system 120 includes one or more processors 122, one or more memory components 126, one or more image sensors 128, one or more device sensors 123, a satellite antenna 125, a network interface hardware 127, and a communication path 124 communicatively connected to the other components of second vehicle system 120. The components of the second vehicle system 120 may be structurally similar to and have similar functions as the corresponding components of the first vehicle system 110 (e.g., the one or more processors 122 corresponds to the one or more processors 112, the one or more memory components 126 corresponds to the one or more memory components 116, the one or more image sensors 128 corresponds to the one or more image sensors 118, the satellite antenna 125 corresponds to the satellite antenna 115, the communication path 124 corresponds to the communication path 114, and the network interface hardware 127 corresponds to the network interface hardware 117). In some embodiments, one or more image sensors 128 may include one or more video sensors configured to capture a plurality of video frames 400 (e.g., as shown in FIG. 6). In some embodiments, one or more image sensors 128 may include image sensors, such as cameras.

Still referring to FIG. 1, the server 140 includes one or more processors 144, one or more memory components 146, a network interface hardware 148, one or more vehicle sensors 149, and a communication path 142 communicatively connected to the other components of the first vehicle system 110. The components of the server 140 may be structurally similar to and have similar functions as the corresponding components of the first vehicle system 110 (e.g., the one or more processors 144 corresponds to the one or more processors 112, the one or more memory components 146 corresponds to the one or more memory components 116, the one or more vehicle sensors 149 corresponds to the one or more vehicle sensors 113, the communication path 142 corresponds to the communication path 114, and the network interface hardware 148 corresponds to the network interface hardware 117). In some embodiments, one or more memory components 146 may include a machine learning model, a random forest classifier, or both. In some embodiments, one or more memory components 146 may include a database for storing fingerprints.

It should be understood that the components illustrated in FIG. 1 are merely illustrative and are not intended to limit the scope of this disclosure.

The first vehicle, second vehicle, or both, may be a vehicle including an automobile or any other passenger or non-passenger vehicle such as, for example, a terrestrial, aquatic, and/or airborne vehicle. For purposes of explanation, the first vehicle is configured to implement the first vehicle system 110 and the second vehicle is configured to implement the second vehicle system 120. In some embodiments, the first vehicle, second vehicle, or both, may be an autonomous driving vehicle. The first vehicle, second vehicle, or both, may be an autonomous vehicle that navigates its environment with limited human input or without human input. The first vehicle, second vehicle, or both, may be equipped with internet access and share data with other devices both inside and outside the first vehicle, second vehicle, or both. The first vehicle, second vehicle, or both, may communicate with the server 140, and transmit their data to the server 140. For example, the first vehicle, second vehicle, or both, transmits information about its current location and destination, its environment, information about a current user, information about a task that it is currently implementing, and the like. The first vehicle, second vehicle, or both, may include an actuator system configured to steer the vehicle and a motor to move the vehicle.

Figure 8:
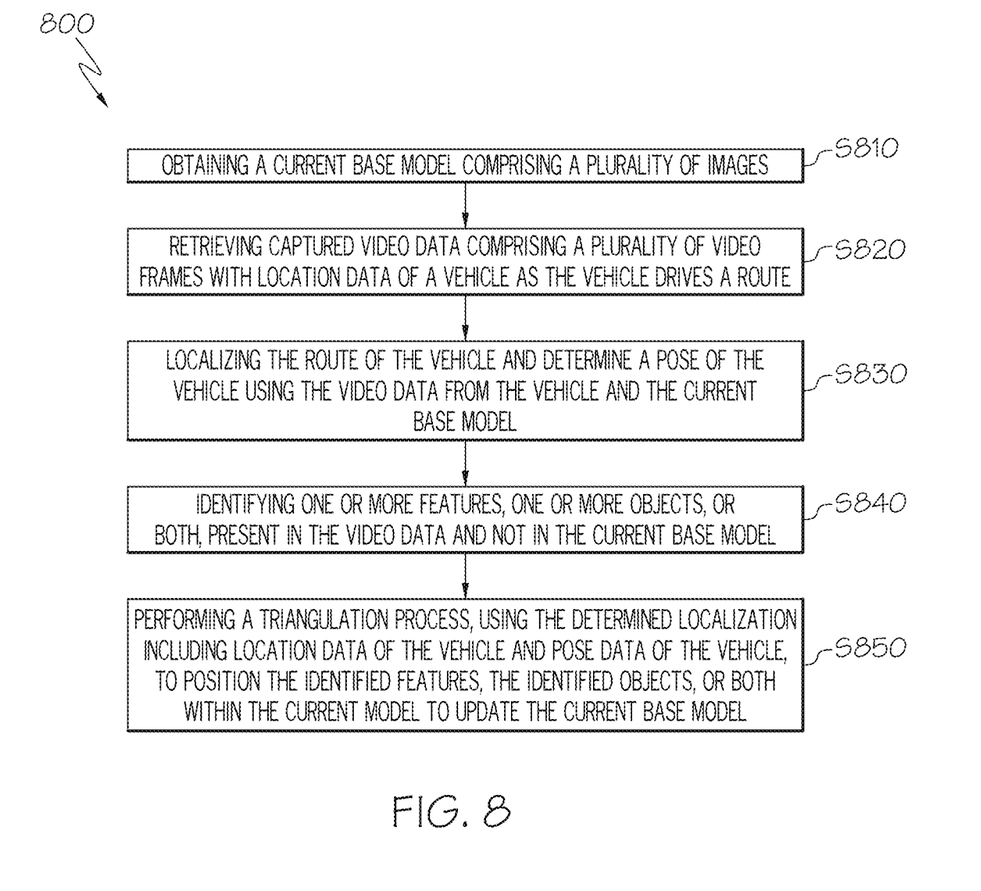
FIG. 8 depicts a flowchart for methods of updating a current base model, according to one or more embodiments shown and described herein.

The first vehicle, the second vehicle, or both, may be a survey vehicle. The survey vehicle may be configured to map an environment with cameras, LIDAR, navigation sensors and the like. The term survey vehicle refers to a vehicle used for automatic collection of road inventory and pavement condition related data required for Road Asset Management, Pavement Maintenance Management System and Road Safety Audit Related Studies. The first vehicle may capture a plurality of spherical images 210 to obtain a current base model 300 (shown in FIG. 4). The second vehicle may capture a plurality of video frames 400 (shown in FIG. 6) to produce an updated base model 320 (shown in FIG. 8). For example, the current base model 300 is generated by image and mapping data collected, for example, by the first vehicle during a first interval of time. The second vehicle at a later interval of time, for example, hours, days, months, or years later, captures a plurality of video frames 400 and/or related information such as position information so that a current base model can be updated to produce an updated base model 320 (e.g., as shown in FIG. 8). For example, when the plurality of video frames 400 (shown in FIG. 6) include differences or changes to environments represented in a current base model 300 (shown in FIG. 4), the system 100 incorporates the changes into the current base model 300 (shown in FIG. 4) to update the current base model 300 (shown in FIG. 4) and thereby generate an updated base model 320 (e.g., as shown in FIG. 8).

Figure 2A:
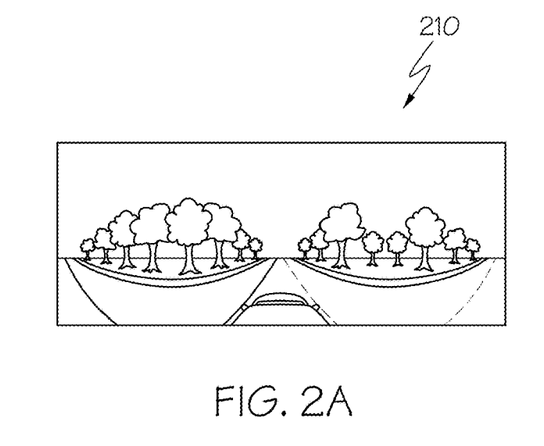
FIG. 2A depicts an exemplary spherical image, according to one or more embodiments shown and described herein.
Figure 2B:
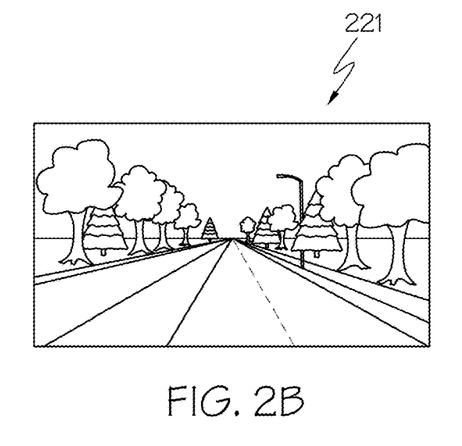
FIG. 2B depicts an exemplary wide-angle front image, according to one or more embodiments shown and described herein.
Figure 2C:
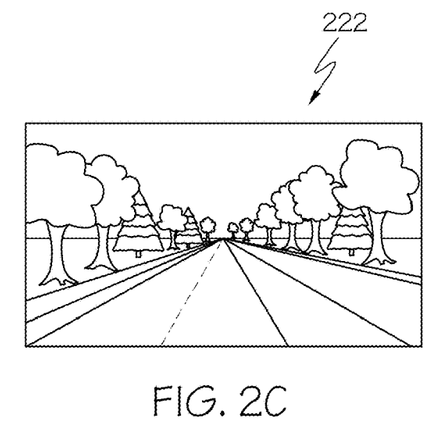
FIG. 2C depicts an exemplary wide-angle back image, according to one or more embodiments shown and described herein.

In embodiments, the system 100 obtains the current base model 300 corresponding to an environment such as a driving environment from the past. The system 100 may obtain the current base model 300 from one or more memory components of the server 140. The current base model 300 may include a plurality of images. The current base model 300 may include a plurality of image pairs. Each of the image pairs may include the front image and the back image. The plurality of images may include the front images 221 and the back images 222 extracted from the plurality of spherical images 210 as depicted in FIGS. 2A-2C. In embodiments, the plurality of images may include opposite facing side view images or a single image direction. The term "front image" refers to an image captured by a camera with a field of view in a direction extending from the front of the vehicle. The term "back image" refers to an image captured by a camera with a field of view in a direction extending from the back of the vehicle. The plurality of spherical images 210 may be taken by a first vehicle. The first vehicle may be a survey vehicle.

The plurality of spherical images 210 may be images of an operational environment of the first vehicle. The first vehicle may move within the environment for performing various tasks such as photography, navigation, asset inspection, and the like. In such instances, the plurality of spherical images 210 may constitute an image sequence depicting the environment surrounding the moving vehicle. The first vehicle may include the image sensors, such as image sensors 118 in FIG. 1. In some embodiments, the plurality of spherical images 210 may be the plurality of video frames 400 (shown in FIG. 5) captured by an image sensor of the second vehicle.

The plurality of spherical images 210 may be two-dimensional images or three-dimensional images. In embodiments, the plurality of spherical images 210 may be taken by a survey vehicle. In embodiments, the plurality of spherical images 210 may be taken within a predetermined time period. For example, the plurality of spherical images 210 may be taken every 1 minute, 50 seconds, 40 seconds, 30 seconds, 20 seconds, 10 seconds, 5 seconds, 3 seconds, 2 seconds, or 1 second. In embodiments, the predetermined time period may be determined based on the speed of the vehicle. For example, the predetermined time period may be short when the speed of the vehicle is high. The first vehicle may send the plurality of spherical images 210 to the second vehicle, the server 140, or both.

Referring to FIGS. 1 and 2A-2C, the system 100 may extract front images 221 and back images 222 from the plurality of spherical images 210. For example, the system 100 may unwrap and resize the plurality of spherical images 210 into front images 221 and back images 222. In some embodiments, the system 100 may extract both front image 221 and back image 222 from each of the plurality of spherical images 210. The system 100 may extract at least one front image 221 and at least one back image 222 from each of the plurality of spherical images 210.

The front image 221 may be a rectilinear image. The front image 221 may be a rectilinear image with a wide field of view. The back image 222 may be a rectilinear image. The back image 222 may be a rectilinear image with a wide field of view.

Figure 3:
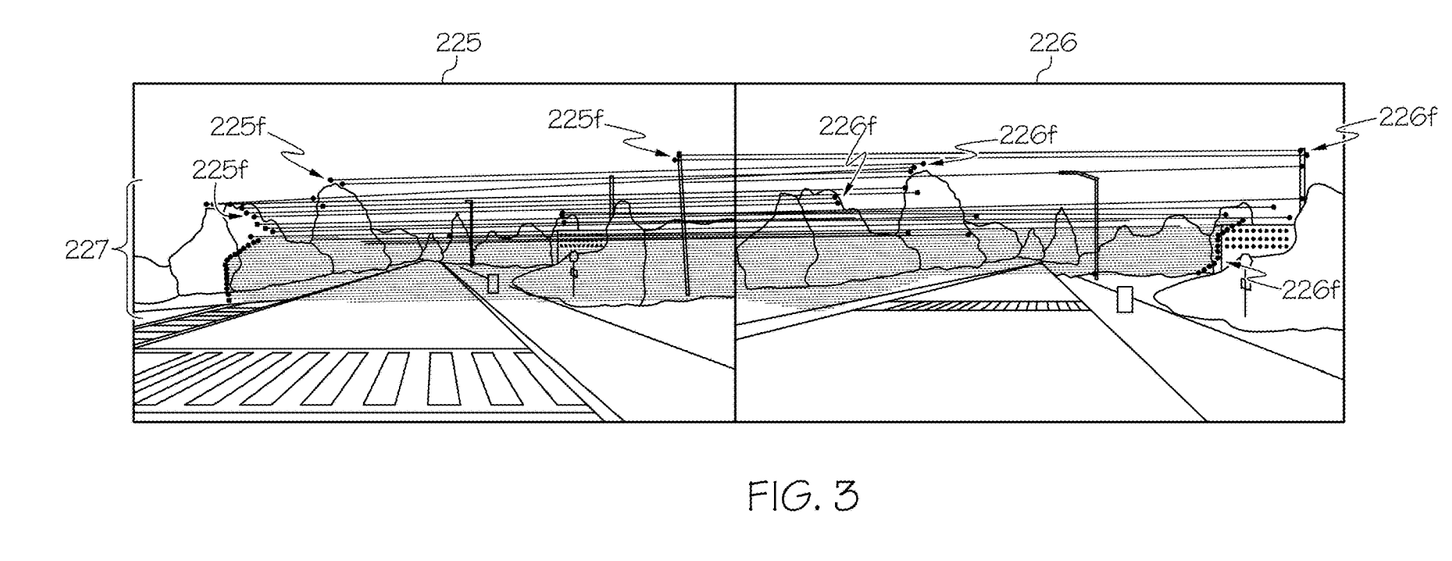
FIG. 3 illustrates a feature correspondence mapping between two or more front images, according to one or more embodiments shown and described herein.

Turning to FIGS. 1 and 3, the system 100 may identify feature points in two or more front images, two or more back images, or both. In some embodiments, the system 100 may identify feature points in two sequential front images, two sequential back images, or both. Two sequential images refer to two images that are in sequence one after the other, optionally separated by one or more intermediate images captured over a period of time. The system 100 may identify feature points in two or more front images 225 and 226. The system 100 may identify feature points 225$f$ in the first front image 225. The system 100 may identify feature points 226$f$ in the second front image 226. The first front image 225 and the second front image 226 are images captured at different instances in time.

The system 100 may identify feature points in two or more back images. The system 100 may identify feature points in each of the two or more back images. The system 100 may identify feature points in the first back image. The system 100 may identify feature points in the second back image. The first back image and the second back image are sequential.

In some embodiments, the feature points may be extracted by one or more processes including, for example, Super-Point, which implements a self-supervised framework for training interest point detectors and descriptors capable of addressing multiple-view geometry problems in computer vision. The feature points may cover one or more visual features in and around the driving environment, one or more objects, or both. The feature points 225$f$ and 226$f$ in the two or more front images 225 and 226 may correspond to boundaries of geometry, corners of geometry, boundaries of signs, corners of signs, boundaries of roadway, corners of roadway, boundaries of obstacles, corners of obstacles, or combinations thereof. The feature points in the two or more back images may include boundaries of geometry, corners of geometry, boundaries of signs, corners of signs, boundaries of roadway, corners of roadway, boundaries of obstacles, corners of obstacles, or combinations thereof. For example, the feature points may relate to objects, such as buildings, bridges, beacons, powerline pylons, road infrastructure objects, such as, a perimeter line of the road, a sidewalk (pavement) edge, a traffic sign, a traffic light, a roundabout entry, a roundabout exit, a turning bay entry, a turning bay exit, a road marking (e.g. a pedestrian crossing, an intersection stop line, a lane marking, a road perimeter marking, etc.), a light pole, a landmark, a traffic sign, geographical landforms, such as mountains, valleys, canyons, oceans, islands, or both, in the operational environment of the vehicle. The feature points may relate to the shape of the objects, the geographical landforms, or both.

In some embodiments, the system 100 may identify the feature points with at least one parameter. The at least one parameter may include a presence or absence of feature points in at least one of the at least two images, respective pixel locations of feature points in the at least two images, three-dimensional locations of feature points with respect to the at least one image sensor, size of feature points in at least one of the at least two images, or combinations thereof. The at least one parameter may relate to characteristics, attributes, or both of feature points in the at least two images.

The system 100 may determine point correspondences 227 between the two or more front images 225 and 226, the two or more back images, or both. The system 100 may match feature points 225f in the first front image 225 with feature points 226f in the second front image 226. In a similar way, the system 100 may match feature points in the first back image with feature points in the second back image, where the first back image and the second back image are sequential. The system 100 may perform this point correspondence search between all pairs of front and back images whose geo-locations are within a certain radius (e.g., 100 feet); a front image may be matched against a back image, and vice versa, if the geo-locations of the two images are within a certain radius.

In some embodiments, the point correspondences 227 may be determined by implementing a neural network such as a neural network trained to match two sets of local features by jointly finding correspondences and rejecting non-matchable points. In embodiments, feature points may or may not be present in all of the two images. For example, due to the movement of the vehicle within the operational environment, a field of view of the first vehicle may be constantly changing, thereby, leading to the presence or absence of feature points in at least one of the two images. For example, a feature related to mountain may be present in one of two images of a hilly region, whereas the same feature related to mountain may be absent in another of the two images. In such examples, the first vehicle may have moved past a mountain such that the mountain was no longer in the field of view of the at least one image sensor. For example, the respective pixel locations of the at least one feature may not be the same in the at least two images. The term "pixel locations" refers to two-dimensional pixel coordinates of the at least one feature in the at least two images.

The system 100 may triangulate feature points in the first front image and the second front image with other front images extracted from the plurality of spherical images 210. The system 100 may triangulate feature points 225f and 226f in two or more front images 225 and 226 with at least one other front image. The system 100 may triangulate feature points in the first back image and the second back image with other back images extracted from the plurality of spherical images 210. The system 100 may triangulate feature points in two or more back images with at least one other back image. The term "triangulation" refers to a process of determining the location of a point by measuring only angles to it from known points at either end of a fixed baseline by using trigonometry, rather than measuring distances to the point directly as in trilateration. The triangulation process may reconstruct 3D feature points. The term "3D feature point" refers to a feature point that is a Geographic Information System (GIS) object that stores its geographic representation—an X, Y, and Z coordinate tuple—as one of its properties (or fields) in the row in the database. The term "reconstruction" refers to a process of recreating an object within a virtual, three-dimensional space. The term "a Geographic Information System (GIS)" refers a computer system that analyzes and displays geographically referenced information.

As depicted in FIG. 4, the system 100 aligns the front images 221 and the back images 222 based on a result of triangulation of the feature points to produce the current base model 300. The current base model refers to a common ancestor for the versions of a model being compared or merged, and is used to track differences between model versions.

Figure 5:
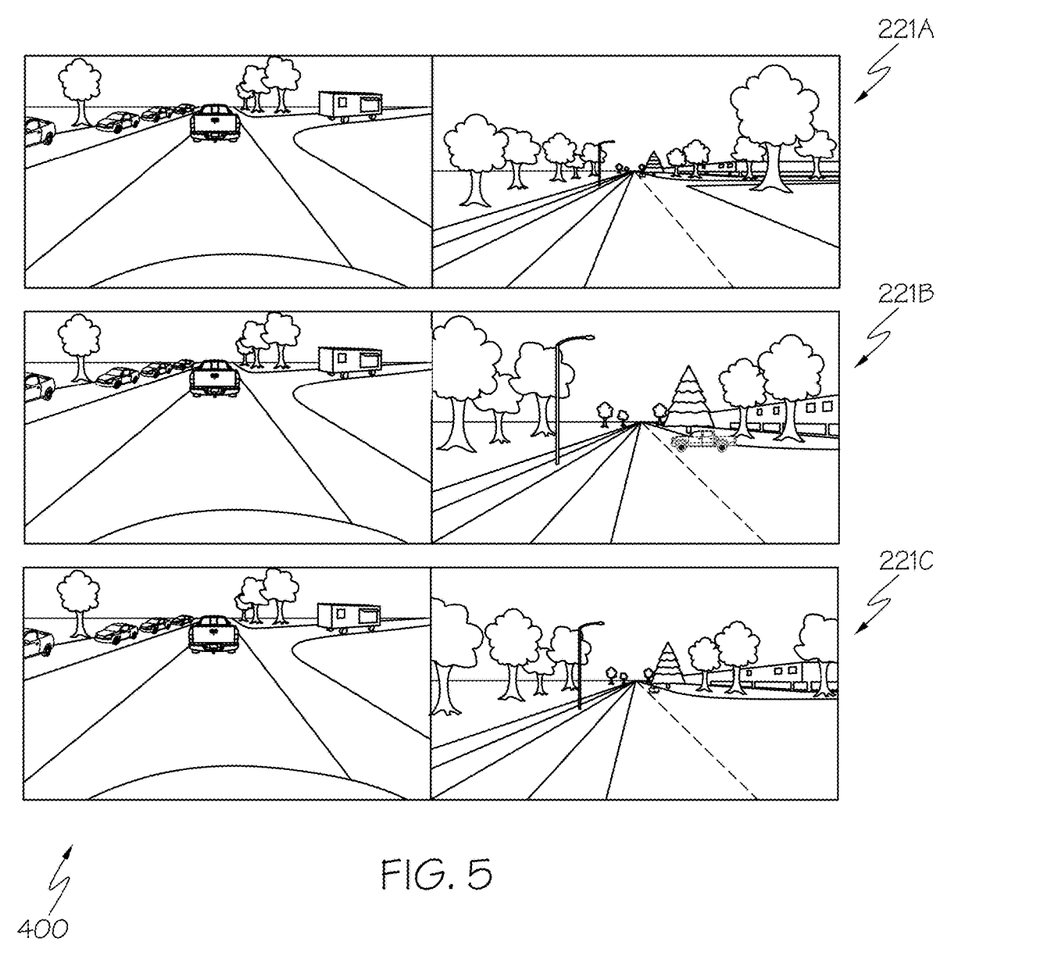
FIG. 5 depicts an exemplary process of finding a closest image among the plurality of images to each of the plurality of video frames, according to one or more embodiments shown and described herein.

The system 100 may align the front images, for example three close front images 221A, 221B, and 221C shown in FIG. 5 and the back images, for example three close back images 222A, 222B, and 222C corresponding to three close front images 221A, 221B, and 221C shown in FIG. 5 respectively, based on a result of triangulation of the feature points and location data of a first vehicle as the first vehicle drives a first route 210A. The front images 221 may face the driving direction of the first vehicle. The back images 222 may face the opposite of the driving direction of the first vehicle.

Figure 7:
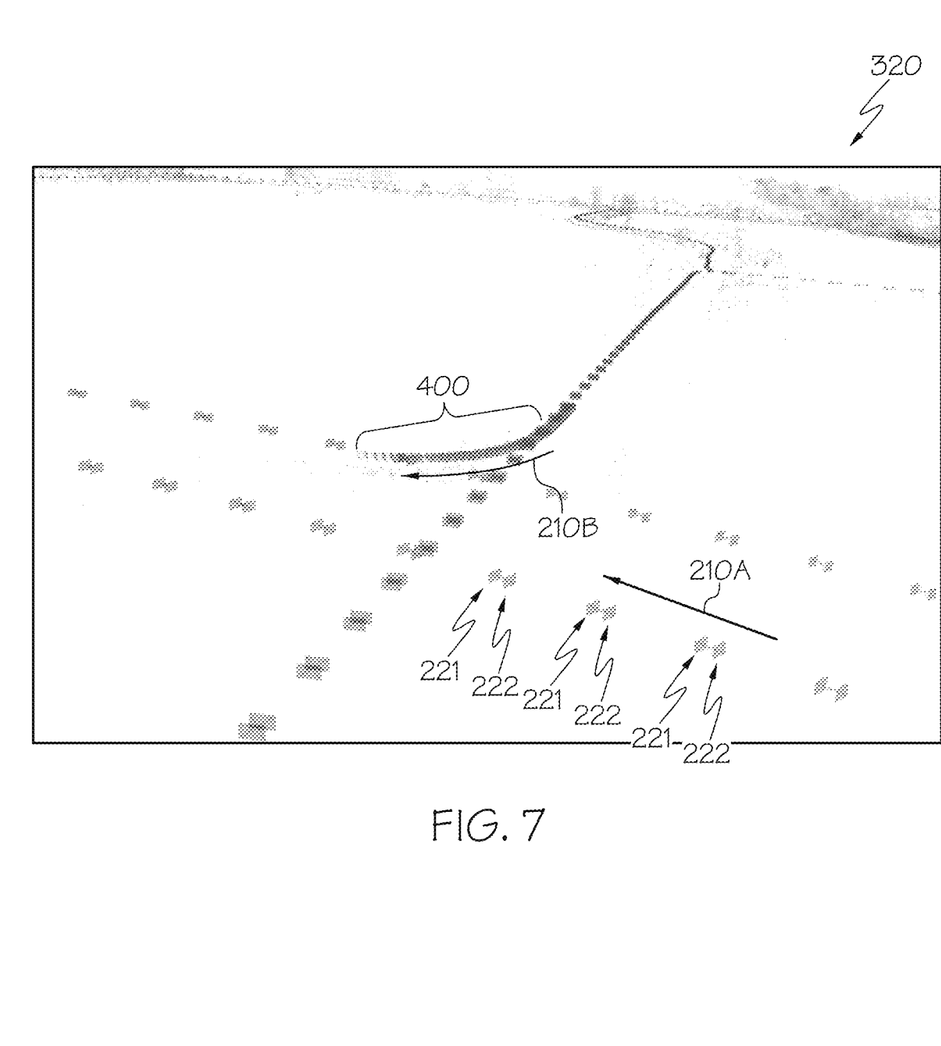
FIG. 7 depicts an exemplary localizing a plurality of video frames in the current base model, according to one or more embodiments shown and described herein.

The system 100 may localize the second route 210B of the second vehicle and determine a pose of the second vehicle using the video data from the second vehicle and the current base model 300. The term "localization" refers to a process for determining the location and orientation of the vehicle, or camera in the vehicle, based on a query image captured by the camera in the vehicle and a set of images labeled with known locations. The location of the vehicle refers to a place where the vehicle is in an environment. The orientation of the vehicle refers to how the vehicle is situated at the location. The term "pose" may be used to describe the location and orientation at the same time. In some embodiments, the system 100 may localize the location of the plurality of video frames 400 in the current base model 300. The location of the plurality of video frames 400 may include data related to the location of the second route 210B of the second vehicle and the orientation of the second vehicle. The orientation of the second vehicle may include a direction the second vehicle is facing. Once localizing the second route 210B of the second vehicle and determining the pose of the second vehicle, image sensors, such as cameras, of the second vehicle may be determined as static with the structure of the second vehicle. Thus, the system 100 may perform structure from motion, which refers to estimating camera poses and 3D scene features, 3D scene objects, or both, such as geometry, from a series of 2D images.

In particular, referring to FIGS. 1 and 5, the system 100 may retrieve captured video data comprising a plurality of video frames 400 with location data of a second vehicle as the second vehicle drives a second route 210B (shown in FIG. 7). The video data may be captured by image sensors of the second vehicle, such as the image sensors 128 depicted in FIG. 1. The plurality of video frames 400 may be taken by the second vehicle. The second vehicle may be different from the first vehicle. In some embodiments, the second vehicle may be a survey vehicle. The second route 210B (shown in FIG. 7) may be different from the first route 210A (shown in FIG. 7). In some embodiments, the second route 210B (shown in FIG. 7) may be a part of the first route 210A (shown in FIG. 7).

To detect changes in the current base model 300 (shown in FIG. 4), the system 100 may conduct landmark clustering and change computation. The clustering stage may attempt to find correspondences between images from different videos and groups the detected objects together and assign them. This preprocessing stage may run separately for the current base model 300 (shown in FIG. 4) and the plurality of video frames 400. This process may enable to find feature points 221F in a plurality of images in the current base model 300, feature points 400F in each of the plurality of video frames 400, including estimating the total number of landmarks. In embodiments, the landmark clustering stage may comprise image match generation between images from the same video and across videos, feature point extractions from all images, feature correspondence search between images, and object clustering and ID (Identification) assignment.

The system 100 may find a closest image among the plurality of images from the current base model 300 to each of the plurality of video frames 400. In some embodiments, the system 100 may find a plurality of close images to each of the plurality of video frames 400 from the current base model 300. By referring to FIGS. 1 and 5, in some embodiments, the system 100 may find three close front images 221A, 221B, and 221C to each of the plurality of video frames 400 from the current base model 300 (shown in FIG. 4). The plurality of the close images may be facing the same direction. For example, the plurality of the close images may be facing the driving direction of the second vehicle. The plurality of the close images may be facing the opposite of the driving direction of the second vehicle. The system 100 may compare each of the plurality of close images to each of the plurality of video frames 400 to find a closest image to each of the plurality of video frames 400. In some embodiments, the system 100 may find three close front images 221A, 221B, and 221C to each of the plurality of video frames 400 from the current base model 300, and then find a closest image 221B among the three close front images 221A, 221B, and 221C to each of the plurality of video frames 400.

Referring to FIGS. 1 and 6, the system 100 identifies feature points 400F in each of the plurality of video frames 400. The feature points 400F in the plurality of video frames 400 may include one or more features, one or more objects, or both. The feature points 400F in the plurality of video frames 400 may include boundaries of geometry, corners of geometry, boundaries of signs, corners of signs, boundaries of roadway, corners of roadway, boundaries of obstacles, corners of obstacles, or combinations thereof. The system 100 identifies the feature points 400F in each of the plurality of video frames 400 with at least one parameter. The at least one parameter may include a presence or absence of feature points in the plurality of video frames 400, respective pixel locations of feature points in the plurality of video frames 400, three-dimensional locations of feature points with respect to the at least one image sensor, size of feature points in the plurality of video frames 400, or combinations thereof. The at least one parameter may relate to characteristics, attributes, or both of feature points in the plurality of video frames 400. For example, the feature points 400F may include the numbers and locations of added landmarks, the numbers and locations of removed landmarks, the estimated number of landmarks in the plurality of video frames 400.

The system 100 identifies feature points 221F in a plurality of images in the current base model 300, such as the closest image 221B. The feature points in the plurality of images may include one or more features, one or more objects, or both. The feature points in the plurality of images may include boundaries of geometry, corners of geometry, boundaries of signs, corners of signs, boundaries of roadway, corners of roadway, boundaries of obstacles, corners of obstacles, or combinations thereof. The system 100 identifies the feature points in each of the plurality of images with at least one parameter. The at least one parameter may include a presence or absence of feature points in the plurality of images, respective pixel locations of feature points in the plurality of images, three-dimensional locations of feature points with respect to the at least one image sensor, size of feature points in the plurality of images, or combinations thereof. The at least one parameter may relate to characteristics, attributes, or both of feature points in the plurality of images. For example, the feature points 221F may include the numbers and locations of added landmarks, the numbers and locations of removed landmarks, the estimated number of landmarks in a plurality of images in the current base model 300.

The system 100 compares the feature points 400F in the plurality of video frames 400 and the feature points in the plurality of images in the current base model 300, such as feature points 221F in the closest image 221B, to detect changes, e.g., addition or removal of one or more landmarks in the current base model 300 (shown in FIG. 4). For example, the system 100 may compare the identified parameter of the feature points 400F in the plurality of video frames 400 and the identified parameter of feature points in the plurality of images in the current base model 300. For example, the system 100 may compare the pixel location of the feature points 400F in the plurality of video frames 400 and the pixel location of feature points in the plurality of images in the current base model 300.

Still referring to FIGS. 1 and 6, the system 100 determines point correspondences 410 between the closest image 221B and each of the plurality of video frames 400 to identify one or more features, one or more objects, or both, present in the video data and not in the current base model 300. The system 100 matches feature points 221F in the closest image 221B with feature points 400F in each of the plurality of video frames 400. The system 100 matches feature points 221F in the closest image 221B with feature points 400F in each of the plurality of video frames 400 and maps between the current base model 300 (shown in FIG. 4) including the closest image 221B and the plurality of video frames 400 In some embodiments, the point correspondences 410 may be found by implementing one or more processes such as SuperGlue that uses a neural network to match two sets of local features by jointly finding correspondences and rejecting non-matchable points.

The system 100 may identify one or more features, one or more objects, or both, present in the video data and not in the current base model 300. In some embodiments, the system 100 may identify one or more features, one or more objects, or both, present in each of the plurality of video frames 400 and not in the closest image 221B.

The system 100 may perform the triangulation process using the determined localization including location data of the second vehicle and orientation data of the second vehicle. The system 100 may perform the triangulation process to position the identified features, the identified objects, or both, within the current base model 300 to produce an updated base model 320 (e.g. as shown in FIG. 7). The triangulation process may be performed to position new features, new objects, or both, within the current base model 300. In some embodiments, the system 100 may triangulate the feature points 221F in the closest image 221B and the feature points 400F in each of the plurality of video frames 400 with other images in the current base model 300 to produce an updated base model 320. The system 100 may triangulate the feature points 221F in the closest front image and the feature points 400F in each of the plurality of video frames 400 with other front images 221 in the current base model 300. The system 100 may triangulate the feature points 221f in the closest back image and the feature points 400F in each of the plurality of video frames 400 with other back images 222 in the current base model 300. The system 100 may reconstruct 3D images by triangulating the 3D positions of point correspondences between the images. (not shown in FIGS.) The term "reconstruction" refers to change 2D images to 3D images.

FIG. 8 depicts a flowchart of an example method 800 for updating a current base model. Method 800 may be executed by the system 100 as depicted in FIG. 1 as described herein. Additionally, the method 800 will be described with reference to the elements depicted in FIGS. 2A-7.

At step S810, a controller, for example, the controller of the first vehicle system 110, the controller of a server 140, the controller of the second vehicle system 120, or combinations thereof, obtain (e.g., retrieve from the one or more memory components 116, 126, or 126) a current base model 300. The current base model 300 may include a plurality of images. The plurality of images may include the front images 221 and the back images 222 extracted from the plurality of spherical images 210.

At step S820, the controller retrieves captured video data comprising a plurality of video frames 400 with location data of a second vehicle as the second vehicle drives a second route 210B. The plurality of video frames 400 may be taken by an image sensor of the second vehicle. The second vehicle may be different from the first vehicle. The second vehicle may be a survey vehicle.

At step S830, the controller localizes the second route 210B of the second vehicle and determines a pose of the second vehicle using the video data from the second vehicle and the current base model 300. In some embodiments, the controller may localize the location of the plurality of video frames 400 in the current base model 300.

At step S840, the controller identifies one or more features, one or more objects, or both, present in the video data and not in the current base model 300. In some embodiments, the controller may identify one or more features, one or more objects, or both, present in each of the plurality of video frames 400 and not in the closest image 221B.

At step S850, the controller executes a triangulation process using the determined localization including location data of the second vehicle and orientation data of the second vehicle. The controller performs the triangulation process to position the identified features, the identified objects, or both, within the current base model 300 to produce an updated base model 320. The triangulation process is performed to position new features, new objects, or both, within the current base model 300.

The systems and methods accurately update a current base model by retrieving captured video data with location data of a vehicle, and localizing a route and an orientation of the vehicle. The systems and methods improve the accuracy and efficiency of processes for updating the current base model without needing to update entire features in the current base model.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A system comprising:
a controller programmed to:
obtain a current base model comprising a plurality of images;

retrieve captured video data comprising a plurality of video frames with location data of a vehicle as the vehicle drives a route;

localize the route of the vehicle and determine a pose of the vehicle, the pose of the vehicle comprising a location of the vehicle and an orientation of the vehicle at a same time, using the video data from the vehicle and the current base model;

identify one or more features, one or more objects, or both, present in the video data and not in the current base model; and perform a triangulation process, using the determined localization including pose data of the vehicle, the pose data of the vehicle pertaining to the location of the vehicle and the orientation of the vehicle at the same time, to position the identified features, the identified objects, or both, within the current base model to update the current base model.

2. The system of claim 1, wherein the route of the vehicle is localized and the pose of the vehicle is determined by:

finding a closest image among the plurality of images from the current base model to each of the plurality of video frames;

comparing the closest image to each of the plurality of video frames; and performing the triangulation process based on a comparison of the closest images and each of the plurality of video frames.

3. The system of claim 2, wherein the controller is further configured to:

identify feature points in the plurality of video frames;

identify feature points in the plurality of images in the current base model; and compare the feature points in the plurality of video frames and the feature points in the plurality of images in the current base model to find the closest image to each of the plurality of video frames.

4. The system of claim 3, wherein the controller is further configured to:

determine point correspondences between the closest image and each of the plurality of video frames to localize a location of the plurality of video frames in the current base model.

5. The system of claim 3, wherein the feature points in the plurality of video frames, the feature points in the plurality of images, or both, comprise boundaries of geometry, corners of geometry, boundaries of signs, corners of signs, boundaries of roadway, corners of roadway, boundaries of obstacles, corners of obstacles, or combinations thereof.

6. The system of claim 1, wherein the controller is further configured to:

obtain a plurality of spherical images to produce the current base model.

7. The system of claim 6, wherein the controller is further configured to:

extract front images and back images from the plurality of spherical images.

8. The system of claim 7, wherein the controller is further configured to:

identify feature points in two or more front images, two or more back images, or both;

determine point correspondences between the two or more front images, the two or more back images, or both;

triangulate feature points with other front images, other back images, or both; and align the front images and the back images based on a result of triangulation of the feature points to produce the current base model.

9. The system of claim 8, wherein each of the front images and the back images is a rectilinear image.

10. The system of claim 1, wherein the plurality of images are taken by a first vehicle and the plurality of video frames are taken by a second vehicle different from the first vehicle.

11. The system of claim 1, wherein the vehicle is a survey vehicle.

12. A method comprising:

obtaining a current base model comprising a plurality of images;

retrieving captured video data comprising a plurality of video frames with location data of a vehicle as the vehicle drives a route;

localizing the route of the vehicle and determine a pose of the vehicle, the pose of the vehicle comprising a location of the vehicle and an orientation of the vehicle at a same time, using the video data from the vehicle and the current base model;

identifying one or more features, one or more objects, or both, present in the video data and not in the current base model; and performing a triangulation process, using the determined localization including pose data of the vehicle, the pose data of the vehicle pertaining to the location of the vehicle and the orientation of the vehicle at the same time, to position the identified features, the identified objects, or both, within the current base model to update the current base model.

13. The method of claim 12, wherein the route of the vehicle is localized and the pose of the vehicle is determined by:

finding a closest image among the plurality of images from the current base model to each of the plurality of video frames;

comparing the closest image to each of the plurality of video frames; and performing the triangulation process based on a comparison of the closest images and each of the plurality of video frames.

14. The method of claim 13, further comprising:

identifying feature points in the plurality of video frames;

identifying feature points in the plurality of images in the current base model; and comparing the feature points in the plurality of video frames and the feature points in the plurality of images in the current base model to find the closest image to each of the plurality of video frames.

15. The method of claim 14, further comprising:

determine point correspondences between the closest image and each of the plurality of video frames to localize a location of the plurality of video frames in the current base model.

16. The method of claim 14, wherein the feature points in the plurality of video frames, the feature points in the plurality of images, or both, comprise boundaries of geometry, corners of geometry, boundaries of signs, corners of signs, boundaries of roadway, corners of roadway, boundaries of obstacles, corners of obstacles, or combinations thereof.

17. The method of claim 12, further comprising:

obtaining a plurality of spherical images to produce the current base model.

18. The method of claim 17, further comprising:
extracting front images and back images from the plurality of spherical images.

19. The method of claim 18, further comprising:
identifying feature points in two or more front images, two or more back images, or both;
finding point correspondences between the two or more front images, the two or more back images, or both;
triangulating feature points with other front images, other back images, or both; and
aligning the front images and the back images based on a result of triangulation of the feature points to produce the current base model.

20. The method of claim 19, wherein each of the front images and the back images is a rectilinear image.

\* \* \* \* \*

UNITED STATES PATENT AND TRADEMARK OFFICE
CERTIFICATE OF CORRECTION

PATENT NO. : 12,417,643 B2
APPLICATION NO. : 18/498525
DATED : September 16, 2025
INVENTOR(S) : Hadi Fadaifard It is certified that error appears in the above-identified patent and that said Letters Patent is hereby corrected as shown below:

In the Specification

In Column 1, Line(s) 39, delete "results" and insert --result--, therefor.

In Column 1, Line(s) 43, after "system", delete "of" and insert --for--, therefor.

In Column 1, Line(s) 58, after "method", delete "of" and insert --for--, therefor.

In Column 1, Line(s) 64, delete "determine" and insert --determining--, therefor.

In Column 2, Line(s) 60, delete "The The" and insert --The--, therefor.

In Column 2, Line(s) 60, after "refers", insert --to--.

In Column 2, Line(s) 63, delete "refer" and insert --refers to--, therefor.

In Column 4, Line(s) 56, before "configured", delete "include one or more image sensors".

In Column 12, Line(s) 59, delete "400 In" and insert --400. In--, therefor.

In the Claims

In Column 16, Line(s) 18, Claim 12, delete "determine" and insert --determining--, therefor.

In Column 16, Line(s) 54, Claim 15, delete "determine" and insert --determining--, therefor.

Signed and Sealed this
Twenty-fifth Day of November, 2025

John A. Squires
*Director of the United States Patent and Trademark Office*